United States Patent [19]

Mortl

[11] 4,366,256

[45] Dec. 28, 1982

[54] REFRACTORY CHROME-MAGNESIA BRICKS AND COMPOSITIONS MADE FROM GRANULAR FUSED MATERIAL

[75] Inventor: Günther L. Mortl, Villach, Austria

[73] Assignee: Osterreichisch-Amerikanische Magnesit Aktiengesellschaft, Carinthia, Austria

[21] Appl. No.: 242,600

[22] Filed: Mar. 11, 1981

[30] Foreign Application Priority Data

Mar. 20, 1980 [AT] Austria .................................. 1507/80

[51] Int. Cl.³ ...................... C04B 35/04; C04B 35/42
[52] U.S. Cl. ...................................... 501/115; 501/117
[58] Field of Search ....................... 501/115, 132, 117; 423/596

[56] References Cited

U.S. PATENT DOCUMENTS

| | | | |
|---|---|---|---|
| 1,524,030 | 1/1925 | Hartmann | 501/132 |
| 2,271,362 | 1/1942 | Field | 501/117 X |
| 2,408,305 | 9/1946 | Field | 501/115 |
| 3,243,305 | 3/1966 | Renkey | 501/115 |
| 3,321,322 | 5/1967 | Mikami | 501/114 |
| 3,328,183 | 6/1967 | Stoyell et al. | 501/115 |
| 3,578,474 | 5/1971 | Whittemore | 501/115 |
| 4,008,092 | 2/1977 | Mortl | 501/117 |
| 4,035,266 | 7/1977 | Alexandrov et al. | 501/132 X |

FOREIGN PATENT DOCUMENTS 339528  5/1972  U.S.S.R. ............................. 501/117

OTHER PUBLICATIONS

"The Firing Expansions of Certain Chrome-Magnesite Products", by G. H. B. Lovell, Transactions of The British Ceramic Soc. (1952), p. 369.

*Primary Examiner*—Helen M. McCarthy
*Attorney, Agent, or Firm*—Finnegan, Henderson, Farabow, Garrett & Dunner

[57] ABSTRACT

Refractory chrome-magnesia bricks and compositions composed of a granular fused material having a grain size of 12 mm or less, and a content of from 71 to 83 wt. % $Cr_2O_3$ and from 17 to 29 wt. % MgO, the minimum content of $Cr_2O_3$ and MgO being 94 wt. %.

9 Claims, No Drawings

REFRACTORY CHROME-MAGNESIA BRICKS AND COMPOSITIONS MADE FROM GRANULAR FUSED MATERIAL

BACKGROUND OF THE INVENTION

The present invention relates to refractory chrome-magnesia bricks and compositions made from a granular fused material and processes for their production. The term "fused material" refers to a product which is obtained by heatng a starting material to its molten state, pouring the melt into a vessel or a mold and then letting the melt solidify in the vessel or mold.

Chrome-magnesia bricks made from fused material are known. Referred to also as fused-cast bricks, such bricks can be made from green chromium oxide (a commercial pigment dye), and high-grade calcined or raw magnesite or purer types of magnesia. U.S. Pat. No. 2,271,362 discloses chrome-magnesite fusion bricks having a composition of 79% $Cr_2O_3$, 20.6% MgO and 0.4% CaO. These bricks can serve as lining in glass tank furnaces, but only below the melt level, because above the melt level they are eroded quickly. Also known are fused-cast bricks of pure $MgO.Cr_2O_3$, that is spinel magnesium chromite, which consists of about 79.2% $Cr_2O_3$ and 20.8% MgO. These bricks, however, show unfavorable properties in the slagging test (Brit. Pat. No. 621,736).

SUMMARY OF THE INVENTION

It is, therefore, a main object of the present invention to provide refractory chrome-magnesia bricks and compositions which overcome the above-mentioned drawbacks.

It is a more specific object of the present invention to provide refractory chrome-magnesia bricks and compositions which are more stable for a variety of purposes than previously known refractory chrome-magnesia bricks and compositions.

A still further object of this invention is to provide a process for producing refractory chrome-magnesia bricks and compositions which are more stable for a variety of purposes than previously known refractory chrome-magnesia bricks and compositions.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the refractory chrome-magnesia bricks and compositions of this invention are comprised of a granular fused material having a grain size of 12 mm or less, and a content of from 71 to 83 wt.% $Cr_2O_3$ and from 17 to 29 wt.% MgO, the minimum content of $Cr_2O_3$ and MgO being 94 wt.%.

To further achieve the objects and in accordance with the purposes of the invention, as embodied and broadly described herein, the refractory chrome-magnesia bricks and compositions of this invention are produced by fusing green chromium oxide or substances yielding $Cr_2O_3$ with magnesia or a material yielding MgO on melting to form a fused material containing from 71 to 83 wt.% $Cr_2O_3$ and from 17 to 29 wt.% MgO, the minimum content of $Cr_2O_3$ and MgO being 94 wt.%; and crushing the fused material to form a granular fused material having a grain size of 12 mm or less.

The foregoing and other objects, features, and advantages of the present invention will be made more apparent from the following description of the preferred embodiments.

DESCRIPTION OF THE PREFERRED EMBODIMENTS

Reference will now be made in detail to the present preferred embodiments of the invention.

In accordance with the invention, refractory chrome-magnesia bricks and compositions are comprised of a granular fused material having a content of 71 to 83 wt.% $Cr_2O_3$ and 17 to 29 wt.% MgO, the minimum content of $Cr_2O_3$ and MgO being 94 wt.%.

These bricks and compositions are produced by first fusing green chromium oxide or substances yielding $Cr_2O_3$, such as chromic acid, with magnesia or a material which on melting yields MgO. As embodied herein, from 71 to 83 wt.% green chromium oxide or substances yielding $Cr_2O_3$ and from 17 to 29 wt.% magnesia or a material yielding MgO on melting which in the fused state contains at least 95 wt.% MgO, preferably synthetic magnesia having a MgO content of at least 97 wt.%, are fused together. The fused material obtained is then crushed to a grain size of at most 12 mm. If desired, the granular fused material can then be shaped into bricks.

Expediently there is used for the composition of the bricks a mixture of crushed fused material, which contains in addition to a coarse grain fraction of at most 12 mm, a fine grain fraction of 0 to 0.2 mm, preferably 0 to 0.12 mm. Most preferably, the fine grain component of a grain size of 0 to 0.12 mm is used in a quantity of 30 to 42 wt.%.

The bricks and compositions according to the invention are especially suitable for the lining of electric furnaces, degassing vessels, glass furnace regenerators and coal gasification plants. The compositions according to the invention constitute in all these linings an excellently usable mortar. The bricks and compositions that are the subject of the invention, chrome-magnesite bricks and composition made from granular fused material, have a considerably better refractoriness and resistance to acid slags as compared with products of magnesite-chrome fused grain material that is, products with a predominant content of MgO.

The invention will be explained in greater detail with reference to the following examples, which, however, must not be taken in a limiting sense. As is general practice for such refractory products, all percentages are percent by weight except the porosity, which is given in percent by volume, and dimensional changes.

EXAMPLE 1

83% finely ground green chromium oxide and 17% seawater magnesia of a grain size of 2 to 4 mm were thoroughly mixed and fused jointly. The percentage composition of the two starting materials and of the resulting fused material were as follows:

|  | Chromium oxide | Seawater magnesia | Fused Material |
| --- | --- | --- | --- |
| $SiO_2$ | 0.6 | 0.1 | 0.52 |
| $Fe_2O_3$ | 0.3 | 0.1 | 0.27 |
| $Al_2O_3$ | 0.7 | 0.1 | 0.60 |

-continued

|  | Chromium oxide | Seawater magnesia | Fused Material |
|---|---|---|---|
| $Cr_2O_3$ | 97.8 | 0.1 | 81.20 |
| CaO | 0.6 | 0.6 | 0.60 |
| MgO | — | 99.0 | 16.81 |

The fused material obtained was crushed and used in various grain sizes for the composition of refractory bricks. Under a program of industrial production, three test series of bricks were produced, which were composed of the following grain fractions of the fused material.

| (a) | (b) | (c) |
|---|---|---|
| 67% 0.3–3 mm | 25% 6–12 mm | 35% 4–8 mm |
| 33% 0–0.12 mm | 25% 1.5–6 mm | 20% 2–4 mm |
|  | 20% 0–1.5 mm | 15% 0.3–2 mm |
|  | 30% 0–0.12 mm | 30% 0–0.12 mm |

With 100 kg of each of the cited refractory grain fractions there were thoroughly mixed 1.5 kg dry sulfite liquor and 1.2 ltr water, the resulting mixtures being compressed to bricks. These were then fired at 1750° C. under reducing conditions in a tunnel furnace. The chemical analysis and the properties of the bricks obtained were as follows:

| Chemical analysis, % | (a) | (b) | (c) |
|---|---|---|---|
| $SiO_2$ | 0.5 | 0.4 | 0.5 |
| $Fe_2O_3$ | 0.3 | 0.2 | 0.3 |
| $Al_2O_3$ | 0.6 | 0.6 | 0.5 |
| $Cr_2O_3$ | 81.0 | 80.1 | 79.8 |
| CaO | 0.6 | 0.6 | 0.6 |
| MgO | 17.0 | 18.1 | 18.3 |
| Test values | (a) | (b) | (c) |
| RG, g/cc | 3.74 | 3.73 | 3.77 |
| Ps, % | 14.2 | 14.4 | 13.4 |
| GDL, nPm | 1.2 | 1.6 | 1.6 |
| KDF, N/mm2 | 72.5 | 38.7 | 38.3 |
| HBF, N/mm2 1260degC. | 11.0 | 8.7 | 8.2 |
| 1480degC. | 1.6 | 1.6 | 1.7 |
| 1600degC. | 2.6 | 1.8 | 2.5 |
| 1750degC. | 1.9 | 1.4 | 1.4 |
| HDFl (1600degC.) |  |  |  |
| max. elongation, % | 1.14 | 1.12 | 1.14 |
| settled 24 h, % | 0.26 | 0.28 | 0.26 |

The meaning of the abbreviations used is as follows:

| RG | Bulk density |
|---|---|
| Ps | Porosity |
| GDL | Gas permeability |
| KDF | Cold crushing strength |
| HBF | Hot bending strength |
| HDFl | Creep resistance |
| abges. | subsidence |

All these bricks show a very good hot pressure flow behavior, and the settling values obtained with them of only 0.26% after 24 h at 1600 deg C. must be rated as outstanding.

EXAMPLE 2

From a mixture of 77% green chromium oxide and 23% sintered seawater magnesia having a content of 99.8% MgO a fused material was obtained with addition of recycle material, i.e., undersize grain which had resulted in an earlier production of fused grain bricks and which contained some chromium ore. It was processed to bricks in the manner described in Example 1 (b). These bricks had the following compositions and test values:

| $SiO_2$ | 0.52% |
|---|---|
| $Fe_2O_3$ | 1.97% |
| $Al_2O_3$ | 1.82% |
| $Cr_2O_3$ | 72.43% |
| CaO | 0.51% |
| MgO | 22.75% |
| RG, g/cc | 3.71 |
| water absorption, % | 3.9 |
| Porosity, % | 14.5 |
| Gas permeability, nPm | 1.2 |
| KDF, N/mm2 | 31.0 |
| HDFl, settled after |  |
| 24 h, % | 0.26 |

EXAMPLE 3

For the production of fused grain bricks having a content of 28.0% MgO, a mixture of 71.6% green chromium oxide (99.0% $Cr_2O_3$, 0.2% $SiO_2$, 0.2% $Fe_2O_3$, 0.2% $Al_2O_3$ and 0.4% CaO) and 28.4% synthetic sintered magnesia of a content of 98.7 MgO and 0.3% $Cr_2O_3$ was used. These bricks, too, showed favorable properties, but, as was found in practical use, their resistance to acid slags is inferior to that of the bricks according to Examples 1 and 2. The composition and properties of these bricks were as follows:

| $SiO_2$ | 0.2% |
|---|---|
| $Fe_2O_3$ | 0.2% |
| $Al_2O_3$ | 0.2% |
| $Cr_2O_3$ | 71.0% |
| CaO | 0.4% |
| MgO | 28.0% |
| RG, g/cc | 3.70 |
| Ps, % | 15.0 |
| Gas permeability, nPm | 1.8 |
| KDF, N/mm2 | 35.0 |
| HDFl, settled after |  |
| 24 h, % | 0.35 |

The results were almost the same when instead of the mentioned 71.6% green chromium oxide a corresponding quantity of chromic acid was used.

What is claimed is:

1. Refractory chrome-magnesite bricks and compositions composed of a granular fused material having a grain size of 12 mm or less, and a content of from 71 to 83 wt.% $Cr_2O_3$ and from 17 to 29 wt.% MgO, the minimum content of $Cr_2O_3$ and MgO being 94 wt.%, wherein said granular fused material includes a coarse grain fraction of at most 12 mm and a fine grain fraction of at most 0.2 mm, said fine grain fraction comprising from 30 to 42 wt.% of said granular fused material.

2. Refractory chrome-magnesite bricks and compositions according to claim 1, wherein said fine grain fraction has a grain size of at most 0.12 mm.

3. A process for the production of refractory chrome-magnesia bricks and compositions comprising: fusing green chromium oxide or substances yielding $Cr_2O_3$ with magnesia or a material yielding MgO on melting to form a fused material composed of 71 to 83 wt.% $Cr_2O_3$ and 17 to 29 wt.% MgO, the minimum content of $Cr_2O_3$ and MgO being 94 wt.%; and crushing said fused material to form a granular fused material having a grain size of 12 mm or less, wherein said granular fused material includes a coarse grain fraction of at most 12 mm and a fine grain fraction of at most 0.2 mm, said fine grain fraction comprising from 30 to 42 wt.% of said granular fused material.

4. The process for the production of refractory chrome-magnesia bricks and compositions according to claim 3 wherein said granular fused material is shaped into bricks.

5. The process for the production of refractory chrome-magnesia bricks and compositions according to claim 3 wherein said material yielding MgO on melting is synthetic magnesia having a MgO content in the molten state of at least 97 wt.%.

6. The process for the production of refractory chrome-magnesia bricks and compositions according to claim 3 wherein said fine grain fraction has a grain size of at most 0.12 mm.

7. Linings of electric furnaces, degassing vessels, glass furnace regenerators, and coal gasification plants made from bricks and compositions according to claim 1.

8. A granular fused refractory material having a high resistance to acid slags, said material consisting essentially of from 71 to 83 wt.% $Cr_2O_3$ and from 17 to 29 wt.% MgO, said material containing at least 94% $Cr_2O_3$ and MgO, said material having a grain size of 12 mm or less and including a fine grain fraction of at most 0.2 mm granular size, said fine grain fraction comprising from 30 to 42 wt.% of said granular fused material.

9. A process for making a chrome-magnesia refractory product, comprising the steps of:
(a) melting a first material yielding $Cr_2O_3$ with a second material yielding MgO to form a fused mixture, said fused mixture consisting essentially of 71 to 83 wt.% $Cr_2O_3$ and 17 to 29 wt.% MgO, the minimum content of $Cr_2O_3$ and MgO being 94 wt.%;
(b) crushing said fused mixture to form a granular fused mixture having a grain size of 12 mm or less and including a fine grain fraction of at most 0.2 mm granular size, said fine grain fraction comprising from 30 to 42 wt.% of said granular fused material; and
(c) forming said crushed granular fused mixture into said refractory product.

* * * * *